United States Patent [19]

Grois et al.

[11] Patent Number: 5,506,922
[45] Date of Patent: Apr. 9, 1996

[54] FIBER OPTIC COMPONENT ASSEMBLY WITH A MOVABLE PROTECTIVE SHIELD

[75] Inventors: Igor Grois, Northbrook; Yuriy Belenkiy, Niles; Mark Margolin, Lincolnwood; Ilya Makhlin, Wheeling; Irina L. Gumin, Skokie, all of Ill.

[73] Assignee: Molex Incorporated, Lisle, Ill.

[21] Appl. No.: 283,377

[22] Filed: Aug. 1, 1994

[51] Int. Cl.$^6$ .................................................. G02B 6/38
[52] U.S. Cl. ............................................................ 385/75
[58] Field of Search .......................................... 385/75–79

[56] References Cited

U.S. PATENT DOCUMENTS

| | | | |
|---|---|---|---|
| 4,611,887 | 9/1986 | Glover et al. | 350/96.21 |
| 4,712,861 | 12/1987 | Lukas et al. | 350/96.21 |
| 4,779,950 | 10/1988 | Williams | 385/75 |
| 4,960,317 | 10/1990 | Briggs et al. | 350/96.21 |

*Primary Examiner*—Akm E. Ullah
*Attorney, Agent, or Firm*—A. A. Tirva

[57] ABSTRACT

An adapter assembly is provided for mating an optical fiber along an optic axis with an associated fiber optic transmission device. The adapter assembly includes a body having an end face for mating with the associated fiber optic transmission device, the end face of the body traversing the optic axis. A movable protective shield is adapted for attachment to the body to cover the end face thereof and prevent ingress of contamination thereinto and to protect operator's eyes. The shield includes a diverting surface in alignment with the optic axis to prevent light energy transmitted by the optical fiber from being reflected back toward the fiber.

12 Claims, 2 Drawing Sheets

FIBER OPTIC COMPONENT ASSEMBLY WITH A MOVABLE PROTECTIVE SHIELD

FIELD OF THE INVENTION

This invention generally relates to the field of fiber optic component assemblies having a protective end cap or dust cover.

BACKGROUND OF THE INVENTION

In the optical fiber field, lightguide fibers are used in optical transmission systems wherein the fibers are connected end-to-end to transfer light or optical energy therebetween. The fibers typically are terminated in connector assemblies which may mate in an adapter which centers the fibers to provide low insertion losses. The connectors are coupled together so that their encapsulated fibers connect end-to-end.

A problem that is encountered when terminating optical fibers in fiber optic connectors, versus terminating electrical conductors in electrical connectors, is that the fiber ends may be damaged by adverse environmental hazards, particularly in the case of an unconnected fiber. In particular, dust and dirt as well as external contact with the fiber may impair the optical transmission capabilities of the fiber.

Consequently, when a fiber optic connector is not in use or is not connected to another connector or associated fiber optic transmission means, it has been proposed to cover the mating end of the connector to prevent dust and other debris from collecting on the exposed end surface of the optical fiber or to prevent external contact therewith. For instance, it is known to provide a dust cover for the end of a fiber optic connector or a housing or body associated with the connector, to be used during transport or storage or at other times when the connector is not in use. One additional very important problem is to protect operator's eyes from dangerous laser beams when the connector is "active".

However, the use of dust covers or end caps present further problems if used in certain applications wherein damage may result from light energy being reflected back toward a fiber as sort of a "feed-back". In other words, if a fiber optic connector is "active" or is transmitting light energy in an unconnected condition, there may be sufficient reflection of the light energy from the dust cover or end cap that the reflected light may damage an active device, such as a laser. Consequently, while the dust cover or end cap may protect the fiber from dust, dirt and damage by external contact, a worse problem may be created by feeding light energy back into the system as a reflection off of the dust cover.

This invention is directed to solving the above problems by providing a movable protective shield which prevents light energy transmitted by an optical fiber from being reflected back toward the fiber and from damaging operator's eyes.

SUMMARY OF THE INVENTION

An object, therefore, of the invention is to provide a new and improved adapter assembly for mating an optical fiber along an optical axis with an associated fiber optic transmission means, with a movable protective shield which prevents feed-back of light energy into the connector assembly and prevents operator's eyes from being damaged.

In the exemplary embodiment of the invention, the adapter assembly includes a body having an end face for mating with an associated fiber optic transmission means. The end face of the body traverses the optic axis. An end shield is adapted for attachment to the body to cover the end face thereof and prevent ingress of contamination thereinto.

The invention contemplates providing diversion means on the end shield in alignment with the optic axis to prevent light energy transmitted by the optical fiber from being reflected back toward the fiber.

In the preferred embodiment, the diversion means is provided by a deflecting surface on the end shield extending at an oblique angle with the optic axis. The end shield is attached to the body by a hinge, with a hinge axis spaced from and generally perpendicular to the optic axis. The oblique angle of the deflecting surface diverges from the hinge axis away from the end face of the body so that the deflecting surface never is perpendicular to the optic axis as the end shield pivots about the hinge to an open position.

The adapter assembly is shown herein with the aforementioned fiber optic connector being a first connector having a housing terminating the optical fiber. The connector is insertable into an adapter. The adapter forms the body with the end face to which the end shield is attached. A second fiber optic connector is adapted to be coupled end-to-end with the first connector within the adapter when the end shield is in an open position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
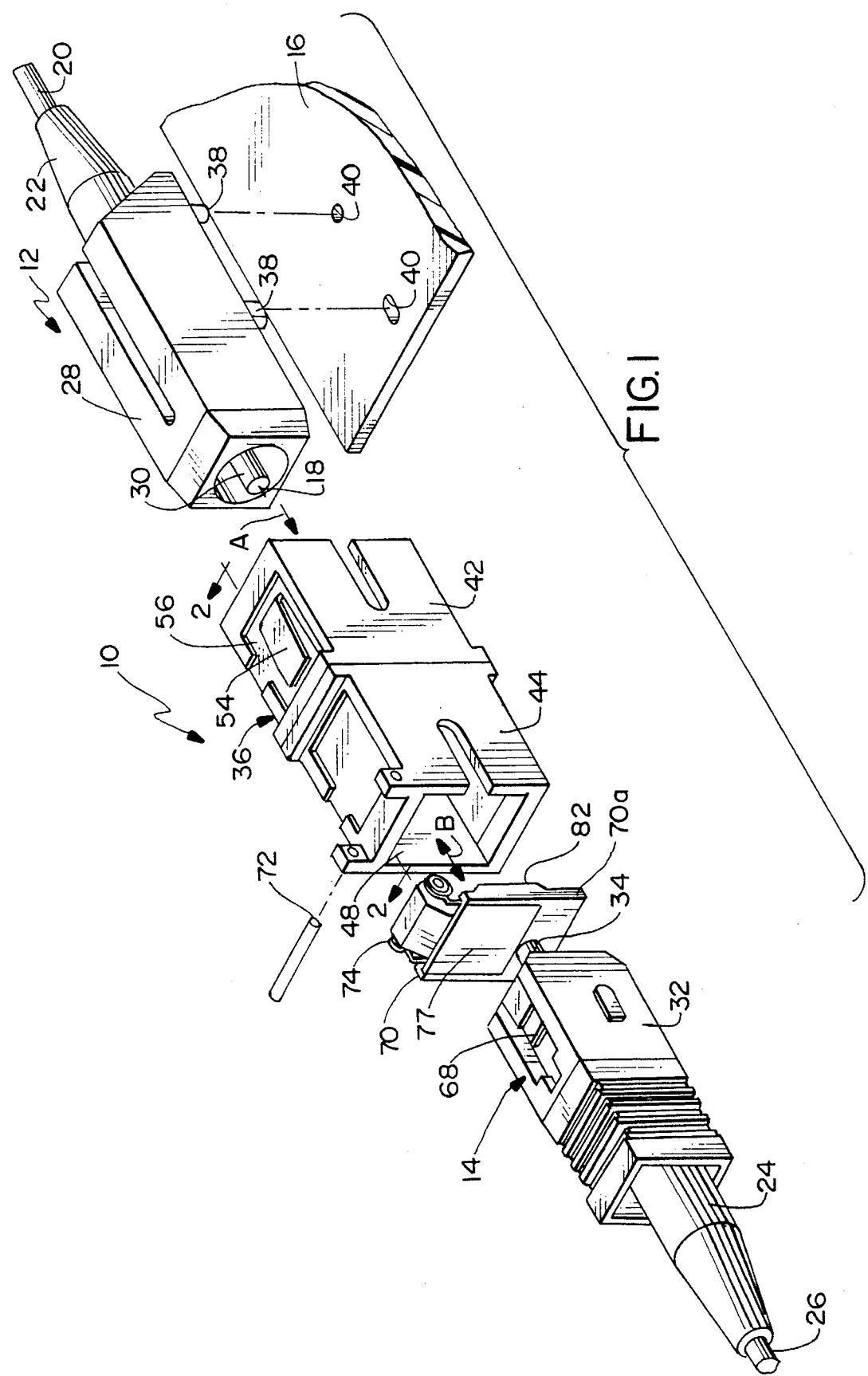
FIG. 1 is an exploded perspective view of a fiber optic adapter assembly embodying the concepts of the invention.

Referring to the drawings in greater detail, and first to FIG. 1, the invention is embodied in an adapter assembly, generally designated 10, which includes a first connector, generally designated 12, and a second connector, generally designated 14. Connector 12 is shown in an application for mounting on a printed circuit board 16 and for mating an end of an optical fiber 18 of a bare fiber 20 to an optical fiber of second connector 14. Connector 12 may include a strain relief boot 22. Connector assembly 14, including a strain relief boot 24, terminates a second fiber optic cable 26. Connector 12 includes a housing 28 mounting a forwardly protruding ferrule 30, and connector 14 includes a housing 32 mounting a forwardly protruding ferrule 34. Connectors 12 and 14 are coupled end-to-end in an adapter, generally designated 36, which may be mounted on a backplane or other panel of an electronic apparatus (not shown in FIG. 1)

to thereby connect the ends of the optical fibers of cables 20 and 26 at an end-to-end interconnection.

Figure 2:
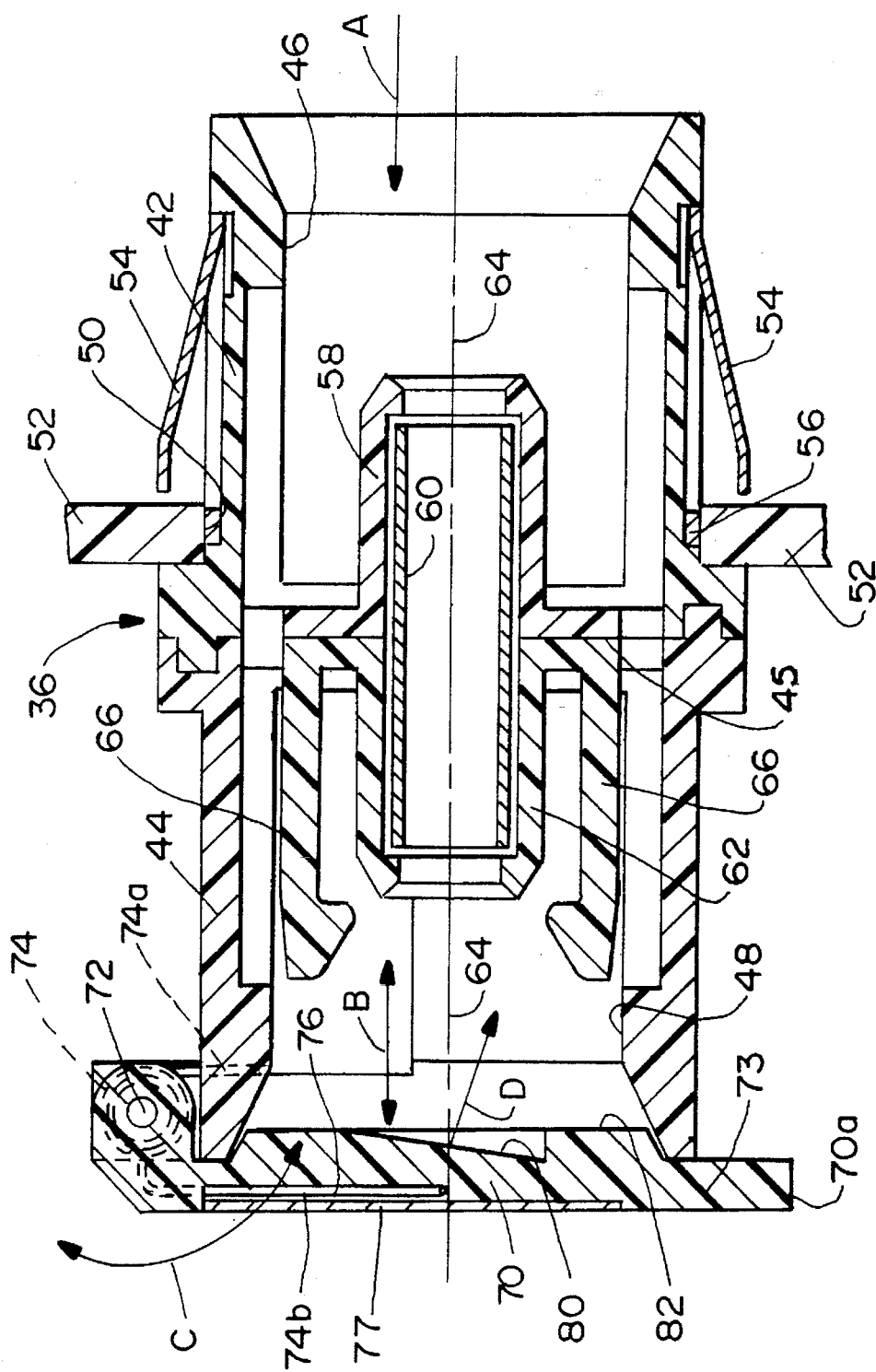
FIG. 2 is a vertical, axial section, on an enlarged scale, through the adapter assembly, taken generally along line 2—2 of FIG. 1.

Referring to FIG. 2 in conjunction with FIG. 1, adapter 36 is shown to include a pair of adapter halves 42 and 44 secured together at an interface 46, as by adhesives. Adapter half 42 forms a receptacle 46 for connector 12, and adapter half 44 forms a receptacle 48 for connector 14. Adapter 36 may be mounted within an aperture 50 (FIG. 2) of a backplane or other panel 52 and held within the panel aperture by a pair of spring latches 54 of a metal plate 56 secured to adapter half 42. When so mounted, connector 12 can be inserted into receptacle 46 in the direction of arrow "A" until ferrule 30 is guided into an interior boss portion 58 of adapter half 42 and into an internal alignment sleeve 60 that spans both adapter halves 42 and 44.

With adapter 36 mounted within aperture 50 of panel 52, and with connector 12 inserted into the adapter, connector 14 can be coupled with and uncoupled from connector 12 by insertion into and removal from receptacle 48 of adapter half 44 in the direction of double-headed arrow "B". More particularly, connector 14 is inserted into receptacle 48 such that ferrule 34 is guided into an interior boss portion 62 and into the opposite end of internal alignment sleeve 60. This aligns the optical fibers of cables 20 and 26 and connects the fiber ends end-to-end on an optic axis 64. A pair of latch arms 66 (FIG. 2) inside adapter half 44 are effective to latch behind shoulders 68 (FIG. 1).

A movable protective shield 70 is hinged to adapter half 44 on a pivot shaft or rod 72 so that the shield can rotate or pivot as indicated by double-headed arrow "C" (FIG. 2). The shield is shown in its closed position covering an end face 73 of adapter 36 and closing receptacle 48. The shield is spring loaded to that position by a coil spring 74 fixed at one end 74a on adapter half 44, with an opposite end 74b secured in a recess 76 of shield 70 to bias the shield to its closed position as shown. In the closed position, the shield extends generally perpendicular across or traverses optic axis 64, and the shield projects beyond adapter half 44 to define a lip 70a for grasping by an operator to pivot the shield to its open position and allow connector 14 to be inserted into receptacle 48 of the adapter. When the connector is removed, spring 74 will automatically bias the end cap back to its closed position as shown, protecting the inside of the connector assembly from dust, dirt or other hazards. A label 77 is shown on the outside of the shield.

As stated in the "Background", above, problems are encountered with dust covers or end caps that are used to protect connectors which may remain active in their unconnected or uncoupled condition. In other words, if connector 14 is removed from adapter 36, shield 70 will extend across or traverse optic axis 64. If connector 12 remains active after this uncoupling, there is a risk that the end cap will reflect light energy transmitted by optical fiber 18 (FIG. 1) back toward the fiber which could create a "feed-back" in the system and cause damage to an active device, such as a laser, coupled to connector 12 through bare fiber 20. Generally, the invention contemplates providing a diversion means on shield 70 in alignment with optic axis 64 to prevent light energy transmitted by optical fiber 18 from being reflected back toward the fiber and to protect operator's eyes.

More particularly, referring to FIG. 2, the diversion means is provided by a deflecting surface 80 on an inside surface 82 of shield 70 and extending at an oblique angle with respect to optic axis 64. In essence, arrow "D" represents the direction that light energy would be deflected perpendicularly away from deflecting surface 80 and oblique to or away from optic axis 64 which represents the transmitting axis of optical fiber 18. It also should be noted that the oblique angle of deflecting surface 80 diverges from the hinge axis of end cap 70 in a direction away from end face 73 of adapter half 44 so that the deflecting surface never is perpendicular to optic axis 64 as the end cap pivots about its hinge axis to its open position.

It should be understood that the invention herein is disclosed in conjunction with movable shield which covers the end face 73 of adapter 36 in order to disclose the existing preferred embodiment or adaptation of the invention. However, it is fully contemplated that a shield or end cap can be attached directly to the end face of a fiber optic connector as is known in the art, without using an adapter at all. In essence, adapter 36 simply forms a body to which the protective shield 70 is hingedly attached. The invention embodied in a diversion means, such as deflecting surface 80, can be used inside an end cap or dust cover attached directly to a connector, such as directly to connector housing 28, all within the concepts of the present invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a fiber optic component assembly for mating an optical fiber along an optic axis with an associated fiber optic transmission means, the component assembly including a body having an end face for mating with the associated fiber optic transmission means, the end face of the body traversing said optic axis, and a movable protective shield adapted for attachment to said body to cover the end face thereof and prevent ingress of contamination thereinto and to protect operator's eyes from intensive laser beam, wherein the improvement comprises diversion means on said movable protective shield in alignment with the optic axis to prevent light energy transmitted by said optical fiber from being reflected back toward the fiber.

2. In a component assembly as set forth in claim 1, wherein said diversion means comprises a deflecting surface on the movable protective shield extending at an oblique angle with said optic axis.

3. In a component assembly as set forth in claim 2, wherein said movable protective shield is attached to the body by a hinge with a hinge axis spaced from and generally perpendicular to said optic axis.

4. In a component assembly as set forth in claim 3, wherein said oblique angle diverges from the hinge axis away from the end face of the body so that the deflecting surface never is perpendicular to the optic axis as the movable protective shield pivots about the hinge to an open position.

5. An adapter assembly for mating an optical fiber along an optic axis with an associated fiber optic transmission means, comprising:

a fiber optic connector having a housing terminating said optical fiber, an adapter having a receptacle at one end for receiving the fiber optic connector and an end face at an opposite end that mates with the associated fiber optic transmission means, the end face of the adapter traversing the optic axis;

a protective shield movably attached to the adapter spaced from and generally perpendicular to the optic axis, the shield being adapted to cover the end face of the adapter and prevent ingress of contamination thereinto and to protect operator's eyes from intensive laser beam.

6. The adapter assembly of claim 5, wherein the shield includes diversion means in alignment with the optic axis to prevent light energy transmitted by said optical fiber from being reflected back toward the fiber.

7. The adapter assembly of claim 6, wherein said diversion means comprises a deflecting surface on the shield extending at an oblique angle with said optic axis.

8. The adapter assembly of claim 7, wherein said shield is attached to the adapter by a hinge with a hinge axis spaced from and generally perpendicular to said optic axis.

9. An adapter assembly of claim 8 wherein said oblique angle diverges from the hinge axis away from the end face of the adapter so that the deflecting surface never is perpendicular to the optic axis as the shield pivots about the hinge to an open position.

10. An adapter assembly of claim 9 wherein said fiber optic adapter comprises a first connector, and including a second fiber optic connector adapted to be coupled end-to-end with the first connector within the adapter when the shield is in an open position.

11. In an adapter assembly for mating an optical fiber along an optic axis with an associated fiber optic transmission means, the adapter assembly including a body for mating with the associated fiber optic transmission means, and a movable protective shield adapted for attachment to the body and extending across the body traversing said optic axis to prevent ingress of contamination into the body and to protect operator's eyes from intensive laser beam, wherein the improvement comprises diversion means on said protective shield in alignment with the optic axis to prevent light energy transmitted by said optical fiber from being reflected back toward the fiber.

12. In an adapter assembly as set forth in claim 11, wherein said diversion means comprise a deflecting surface on the movable protective shield extending at an oblique angle with the optic axis.

* * * * *